(12) United States Patent
Cardwell

(10) Patent No.: US 6,615,624 B2
(45) Date of Patent: Sep. 9, 2003

(54) MOTOR VEHICLE ANTI-THEFT APPARATUS AND METHOD

(76) Inventor: Douglas C. Cardwell, 5443 16th Ave. Apt. T4, Hyattsville, MD (US) 20782

(*) Notice: Subject to any disclaimer, the term of this patent is extended or adjusted under 35 U.S.C. 154(b) by 0 days.

(21) Appl. No.: 10/119,886

(22) Filed: Apr. 11, 2002

(65) Prior Publication Data

US 2002/0108411 A1 Aug. 15, 2002

Related U.S. Application Data

(63) Continuation-in-part of application No. 09/480,106, filed on Jan. 10, 2000, now abandoned.
(60) Provisional application No. 60/117,022, filed on Jan. 25, 1999.

(51) Int. Cl.[7] ............................................. B60R 25/00
(52) U.S. Cl. ............................ 70/226; 70/201; 70/237; 70/256; 70/257; 180/287; 188/265; 303/89
(58) Field of Search ................... 70/225–228, 237–239, 70/256, 257, 201, 254, 255; 188/69, 265, 353; 180/287; 303/89

(56) References Cited

U.S. PATENT DOCUMENTS

| | | | |
|---|---|---|---|
| 1,210,640 A | | 1/1917 | Goldmerstein ............... 70/202 |
| 2,974,752 A | * | 3/1961 | Howard ....................... 188/265 |
| 3,652,103 A | | 3/1972 | Higgs ............................ 70/226 X |
| 3,744,285 A | | 7/1973 | Barmherzig .................. 70/241 |
| 4,034,824 A | | 7/1977 | Lucas ........................... 180/114 |
| 4,199,043 A | | 4/1980 | Lankester et al. ........... 188/111 |
| 4,280,595 A | * | 7/1981 | Timms et al. ................ 188/31 |
| 4,519,653 A | | 5/1985 | Smith ........................... 303/89 |
| 4,577,880 A | | 3/1986 | Bianco ......................... 188/31 X |
| 4,579,202 A | * | 4/1986 | McIntosh ..................... 70/255 X |
| 4,714,131 A | * | 12/1987 | Wisegerber .................. 180/287 |
| 4,777,377 A | | 10/1988 | Jeter ............................ 180/287 X |
| 4,907,427 A | | 3/1990 | Armstrong ................... 70/252 |
| 4,934,490 A | | 6/1990 | Chang .......................... 180/31 |

(List continued on next page.)

FOREIGN PATENT DOCUMENTS

| | | | | |
|---|---|---|---|---|
| AU | 154353 | * | 11/1953 | |
| DE | 421609 | * | 11/1925 | ................... 188/69 |
| DE | 2037331 | * | 2/1971 | ................... 188/265 |
| FR | 2 534 205 | | 4/1984 | ................... 180/287 |
| GB | 2035486 | * | 6/1980 | |
| GB | 2263512 | * | 7/1993 | ................... 70/276 |
| JP | 58-78847 | | 5/1983 | ................... 180/287 |
| JP | 0081852 | * | 4/1986 | ................... 188/265 |
| JP | 4-271203 | | 9/1992 | ................... 188/69 |
| JP | 405139271 | * | 6/1993 | ................... 188/265 |
| WO | WO91/18771 | * | 12/1991 | ................... 70/264 |
| WO | WO93/09981 | | 5/1993 | ................... 188/69 |

OTHER PUBLICATIONS

The Commerce Insurance Company, Anti–Theft Device—Discount Form, Mar. 1991, 4 pages (not numbered).
Terry White, Combatting Car Theft, AAA World, Nov./Dec. 1994, pp. 30 and 31.

*Primary Examiner*—Lloyd A. Gall
(74) *Attorney, Agent, or Firm*—Stephen Christopher Swift; Swift Law Office

(57) ABSTRACT

An anti-theft system for motor vehicles. The preferred embodiment is designed to prevent theft by preventing a vehicle's wheels from turning when the system is activated. In the preferred embodiment, there are inhibitors in the disc rotors of each wheel. Next to each wheel, there is a solenoid, within which is a locking pin or piston rod. When the user enters an activation coded key in an ignition, the solenoids are energized, causing the piston rods to move outward into arcuate recesses, thus preventing the rotor discs from turning. A deactivation code must be entered in the ignition to de-energize the solenoids, causing the piston rods to move back into the solenoids and releasing the rotor discs. Optionally, the parking brake may also be locked when the system is activated.

4 Claims, 11 Drawing Sheets

U.S. PATENT DOCUMENTS

| | | | |
|---|---|---|---|
| 4,942,949 A | * | 7/1990 | Dai .................... 188/265 X |
| 5,078,456 A | * | 1/1992 | Cox ......................... 303/89 |
| 5,133,201 A | | 7/1992 | LaMott et al. ............ 70/226 |
| 5,154,493 A | * | 10/1992 | Futrell et al. ............. 303/89 |
| 5,335,758 A | * | 8/1994 | Zalesky .................. 188/353 |
| 5,357,182 A | | 10/1994 | Wolfe et al. ............. 318/379 |
| 5,429,212 A | | 7/1995 | Schlosser ................. 188/69 |
| 5,431,244 A | | 7/1995 | Possobom ............... 180/287 |
| 5,484,044 A | * | 1/1996 | Bursteinas et al. .. 188/181 T X |
| 5,549,183 A | | 8/1996 | Buchanan, Jr. et al. ..... 188/265 |
| 5,713,436 A | * | 2/1998 | Gjovik .................. 188/265 X |
| 5,742,236 A | | 4/1998 | Cremers et al. ......... 70/460 X |
| 5,842,364 A | | 12/1998 | Oliver ....................... 70/202 |
| 5,845,751 A | | 12/1998 | Chant .................... 188/69 X |
| 5,925,940 A | | 7/1999 | Donatelle et al. ........ 70/256 X |
| 6,269,917 B1 | * | 8/2001 | Harting et al. .......... 188/69 X |

* cited by examiner

MOTOR VEHICLE ANTI-THEFT APPARATUS AND METHOD

CROSS REFERENCE TO RELATED APPLICATIONS

This application is a Continuation-In-Part of Ser. No. 09/480,106, filed on Jan. 10, 2000, now abandoned, based on Provisional Patent Application Serial No. 60/117,022, filed Jan. 25, 1999.

BACKGROUND OF THE INVENTION

1. Field of the Invention

The present invention relates to apparatus and methods for preventing the theft of motor vehicles.

2. Description of the Prior Art

Automobile theft is a serious problem, both in the United States of America, and in other industrialized countries. There have been many previous anti-theft devices invented for motor vehicles. The present invention has one preferred embodiment. The anti-theft system is activated and/or deactivated when the owner or authorized user of the vehicle enters a coded key in an electronic ignition, or by other means. Solenoids cause piston rods to pass through openings in the vehicle's rotor discs when the system is activated, thus preventing the wheels from turning.

U.S. Pat. No. 1,210,640, issued on Jan. 2, 1917, to Leon Goldmerstein, discloses a solenoid actuated rod which locks the brake of an automobile, rather than a rotor disc of an automobile, as in the instant invention.

U.S. Pat. No. 3,652,103, issued on Mar. 28, 1972, to Stuart P. Higgs, discloses an automatic brake for a shopping cart, in which an automatic lock is released by a timing mechanism after a predetermined period of time.

U.S. Pat. No. 3,744,285, issued on Jul. 10, 1973, to Sam Barmherzig, discloses an ignition and hood lock assembly for automotive vehicles, having a solenoid operated hood locking mechanism, but not a solenoid operated wheel locking mechanism, as in the instant invention.

U.S. Pat. No. 4,034,824, issued on Jul. 12, 1977, to Harold P. Lucas, discloses a vehicle wheel lock assembly, with retractable rods that fit through circular slots in the wheels to prevent them from turning. The instant invention is distinguishable, in that in it the retractable rods are activated by solenoids when the user enters a secret coded key, and in the preferred embodiment, the rods do not pass through the wheels, but lock the rotor discs.

U.S. Pat. No. 4,199,043, issued on Apr. 22, 1980, to John E. Lankester and Keith T. Flaherty, discloses a lock assembly for a shopping cart to prevent its removal from an authorized area.

U.S. Pat. No. 4,519,653, issued on May 28, 1985, to Paul B. Smith, discloses an anti-theft lock device for a motor vehicle, which automatically locks the parking brake, until the owner inserts his key and turns the ignition, which causes a solenoid to be activated that retracts the locking mechanism. The instant invention is distinguishable, in that in it the rotor discs are prevented from turning by rods inserted into arcuate recesses in metal disks comprising parts of the wheels.

U.S. Pat. No. 4,577,880, issued on Mar. 25, 1986, to Eric L. Bianco, discloses a theft prevention apparatus for shopping carts, in which a magnetic field causes a solenoid to move a ball in contact with a pin to lock the wheels of the shopping cart. The instant invention is distinguishable, in that it does not rely on the presence of a magnetic field.

U.S. Pat. No. 4,777,377, issued on Oct. 11, 1988, to Herman C. Jeter, discloses a motor vehicle anti-theft system, where a key switch or magnetically coded card activates or deactivates solenoids that disable functions of the vehicle. The instant invention is distinguishable, in that it discloses the insertion of rods into rotor discs to prevent the vehicle's wheels from turning.

U.S. Pat. No. 4,907,427, issued on Mar. 13, 1990, to Enneis D. Armstrong, discloses a steering wheel shaft lock assembly.

U.S. Pat. No. 4,934,490, issued on Jun. 19, 1990, to Deng J. Chang, discloses an anti-roll device for vehicles, which is similar to the instant invention in acting directly on the wheels, but is different in that it only prevents the wheels from turning in one direction, and acts by means of a ratchet rather than by means of rods that are removably inserted into holes in the rotor discs.

U.S. Pat. No. 5,133,201, issued on Jul. 28, 1992, to Darryl L. LaMott and David R. Lee, discloses a vehicle wheel locking assembly, which resembles the instant invention in that a rod or "locking stud" is inserted into holes in a disk to prevent the wheels from turning. But the present invention is distinguishable, in that it uses solenoids to move the rods, and requires the use of electronically coded keys to activate or deactivate the solenoids.

U.S. Pat. No. 5,357,182, issued on Oct. 18, 1994, to Steven M. Wolfe and John V. Biondo, Jr., discloses a shopping cart theft prevention system, designed to prevent a shopping cart from being moved outside of a defined perimeter. It uses a magnetic brake to gradually stop the wheel from turning, rather than a solenoid activated locking pin, as in the instant invention.

U.S. Pat. No. 5,429,212, issued on Jul. 4, 1995, to Kraig J. Schiosser, discloses a parking lock mechanism, designed for electric cars, with locking pins that fit into locking holes in the "drive train assembly". The instant invention is distinguishable, in that in it the user enters a secret coded key to release the locking mechanism, and the locking pins fit directly into arcuate recesses in the rotor discs of the vehicle.

U.S. Pat. No. 5,431,244, issued on Jul. 11, 1995, to José D. Possobom, discloses an anti-theft shift-lock for automotive vehicles, which includes locking pins, solenoids and electronic codes, but the locking pins lock the transmission, rather than directly locking the rotor discs as in the present invention.

U.S. Pat. No. 5,549,183, issued on Aug. 27, 1996, to Harry C. Buchanan, Jr. and Peter S. Zhou, discloses a motor locking unit, in which the motor itself, rather than the wheels, is locked by flexible arms with fingers that engage ridges on a circular member connected to the shaft of the motor.

U.S. Pat. No. 5,742,236, issued on Apr. 21, 1998, to Rolf Cremers and Wolfgang Ziegler, discloses an electronic code locking mechanism that can deactivate a motor drive interlock. However, there is no disclosure of rods being inserted into metallic parts of a vehicle's rotor discs, as in the present invention.

U.S. Pat. No. 5,842,364, issued on Dec. 1, 1998, to Richard D. Oliver, discloses a vehicle immobilizing system, with a solenoid for retracting and extending a retractable shaft that prevents that locks the brake pedal.

U.S. Pat. No. 5,845,751, issued on Dec. 8, 1998, to William Chant, discloses a safety lock for a chain driven machine, which engages sprocket wheels of the machine.

U.S. Pat. No. 5,925,940, issued on Jul. 20, 1999, to Gary L. Donatelle, Leonard B. Prusakowski, and Fred H. Bednar, which locks the parking brake of a vehicle when a code is entered using a keypad. The instant invention is distinguishable, in that it locks the rotor disc in the vehicle's wheels.

Japanese Patent No. 58-78847, published on May 12, 1983, invented by Teruyuki Yano, discloses a vehicle anti-theft device, in which an electronically coded card must be inserted into a slot in order to start the engine. The instant invention is distinguishable, in that it locks the vehicle's rotor discs, rather than its motor.

French Patent No. 2 534 205, published on Apr. 13, 1984, invented by Michel Filleul, discloses an anti-theft device for motor vehicles, using an electronic code to deactivate essential components of the motor, while activating an alarm during an attempted break-in. Unlike the instant invention, it does not directly lock the rotor discs.

Japanese Patent No. 4-271203, published on Sep. 28, 1992, inventor Takeshi Ishida, discloses a brake unit for a truck.

International Patent Application No. 93/09981, published on May 27, 1993, to Nam Chae Kim, discloses an auxiliary emergency braking system for automobiles.

Anti-Theft Device—Discount Form, The Commerce Insurance Company, March 1991, discloses several anti-theft devices on the market, none of which prevent the vehicle's rotor discs from turning by solenoid-activated rods inserted into arcuate recesses in metallic portions of the wheels.

Combatting Car Theft, AAA World, November/December 1994, pp. 30–31, discloses a number of motor vehicle anti-theft devices, including the use of an electronically read pellet on the ignition key that is required to start the engine.

None of the above inventions and patents, taken either singly or in combination, is seen to describe the instant invention as claimed.

SUMMARY OF THE INVENTION

The present invention is an anti-theft system for motor vehicles, having one preferred embodiment. The preferred embodiment is designed to prevent theft by preventing a vehicle's rotor discs from turning when the system is activated. In the embodiment, there are inhibitors inside of the disc rotors of each wheel. Next to each wheel, there is a solenoid, within which is a locking pin or piston rod. When the user enters an activation coded key in the ignition keypad, the solenoids are energized, causing the piston rods to move outward into the spaces in the disc rotors between the inhibitors, thus preventing the wheels from turning. A deactivation code must be entered in the ignition keypad to de-energize the solenoids, causing the piston rods to move back into the solenoids and releasing the wheels. Optionally, the parking brake may also be locked when the system is activated.

Accordingly, it is a principal object of the invention to provide a more effective means of preventing motor vehicle theft, by an improved method for locking the wheel of a vehicle.

It is another object of the invention to combine the improved method for locking the wheels of a vehicle with means for locking the vehicle's brakes.

It is a further object of the invention to provide a more effective means for preventing motor vehicle theft, by an improved method for locking the brakes of a vehicle.

Still another object of the invention is to combine improved methods of locking the wheels and/or brakes of a vehicle with a means of activating and/or deactivating the anti-theft system through entry of a secret code.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an anti-theft system for automobiles and other motor vehicles, having two preferred embodiments.

Figure 1:
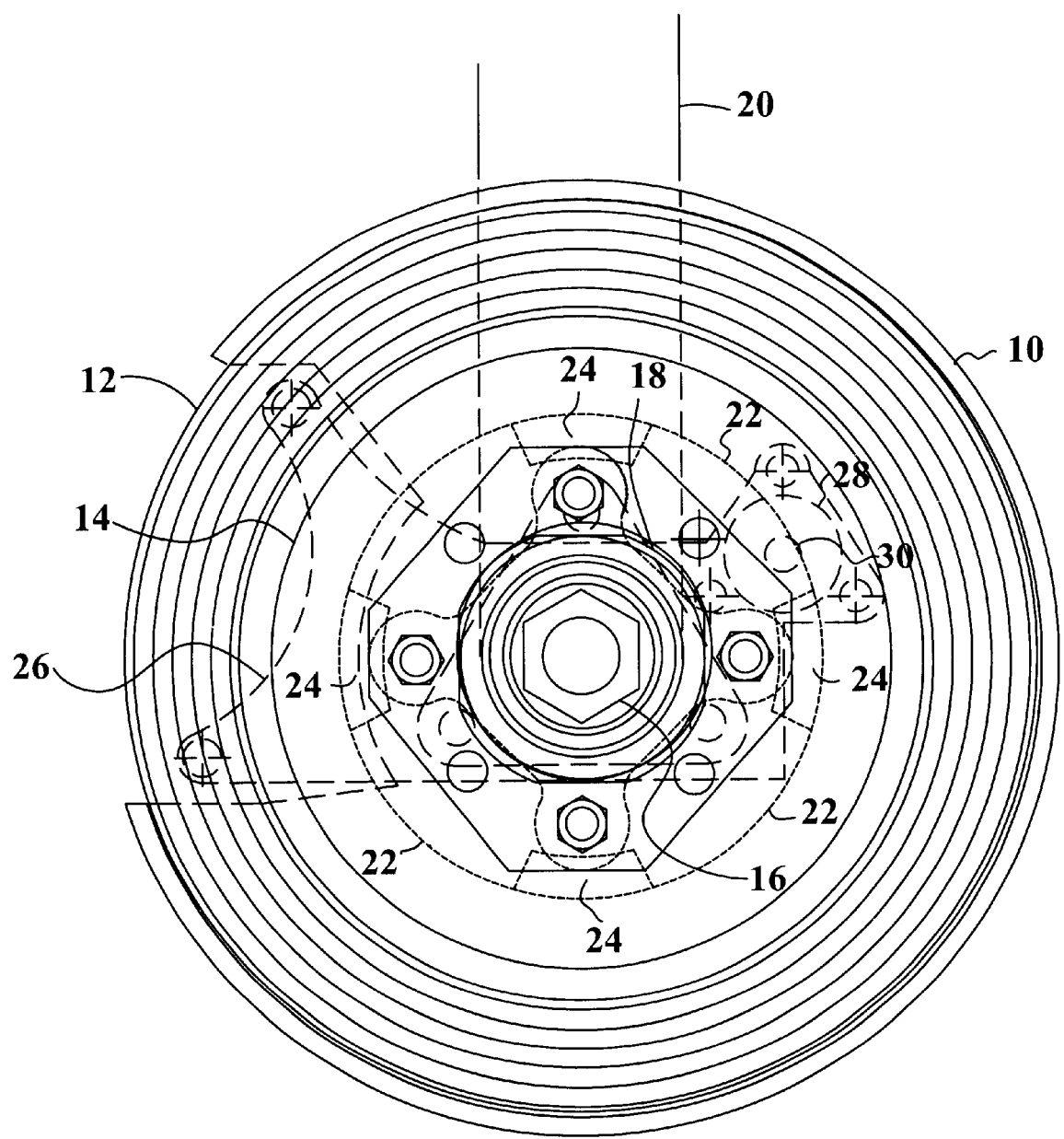
FIG. 1 is a front elevational view of a motor vehicle wheel hub assembly incorporating the preferred embodiment of the invention.

FIG. 1 is a front elevational view of a motor vehicle wheel hub assembly incorporating the preferred embodiment of the invention, showing the baffle plate 10, the disc rotor 12, the wheel hub 14, the wheel bearing lock nut 16, the hub cap 18, the strut assembly 20 that supports the wheel, four inhibitors 22 in the rotor discs, four obstructions 24 between the inhibitors, the piston rod and solenoid support bracket 26, the solenoid 28, and the piston rod 30. (Parts shown in dashed lines are hidden from view.) When the solenoid is energized by electric current flowing through it, it causes the piston rod to move outwards, and when the solenoid is de-energized after the electric current is turned off, it causes the piston rod to move back into the solenoid, by means that are well known to those skilled in the art. (The electric current to energize the solenoids will normally be supplied by the vehicle's storage battery.) When the piston rod moves outward, it will normally be inserted into one of the inhibitors, thus locking the rotor disc by preventing it from turning beyond the limited angle of the opening. However, sometimes the piston rod will be blocked by one of the obstructions between the inhibitors, in which case it will be necessary for the driver to move the vehicle slightly forward or backward, so that the piston rod can avoid the obstruction and pass into an inhibitor to lock the rotor disc. When the current to the solenoid is turned off, and the piston rod moves back in, the rotor disc is released so that it can rotate normally.

Figure 2:
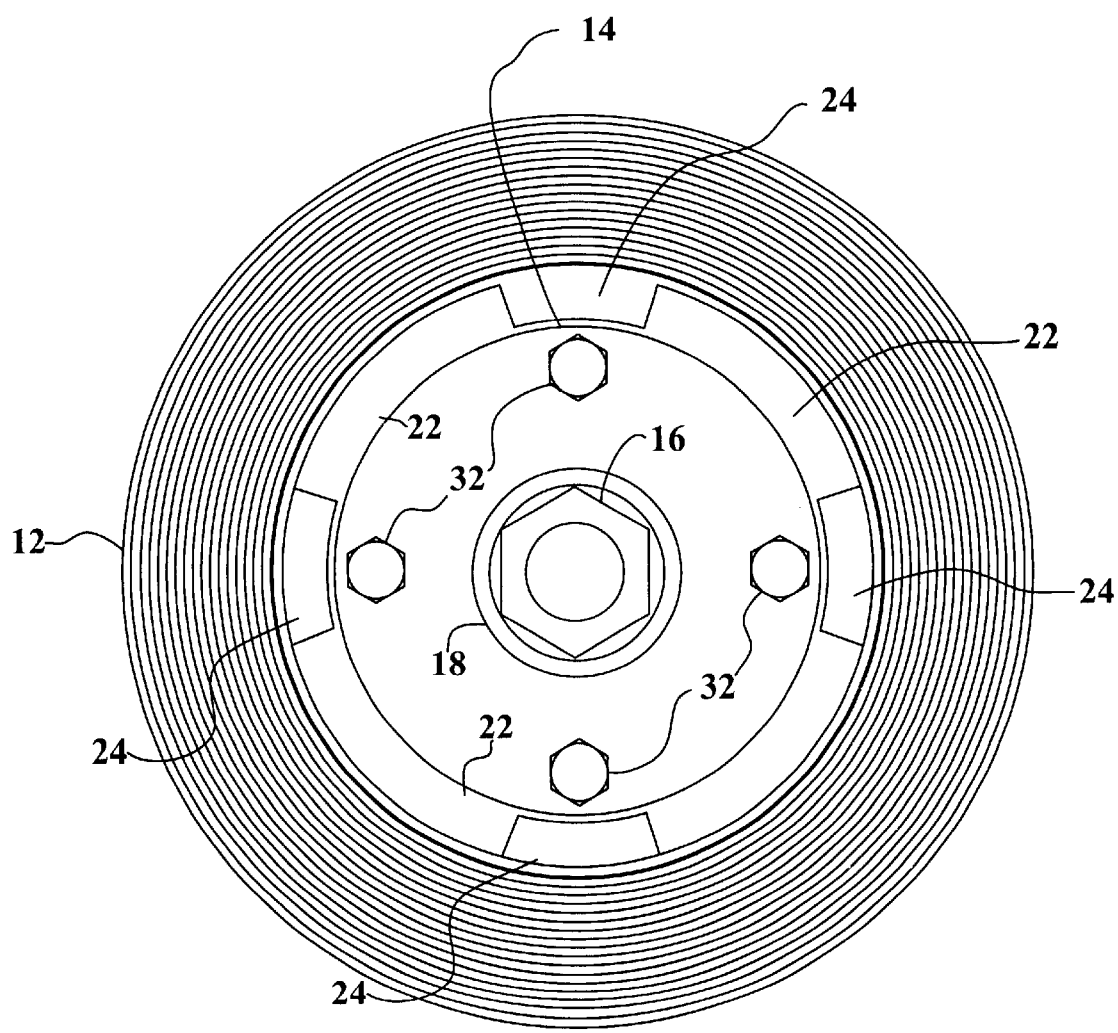
FIG. 2 is a detail view of the central portion of the motor vehicle wheel hub assembly shown in FIG. 1.

FIG. 2 is a detail view of the central portion of the motor vehicle wheel hub assembly shown in FIG. 1, more clearly showing features identified before, and the bolts 32 that secure the wheel hub.

Figure 3:
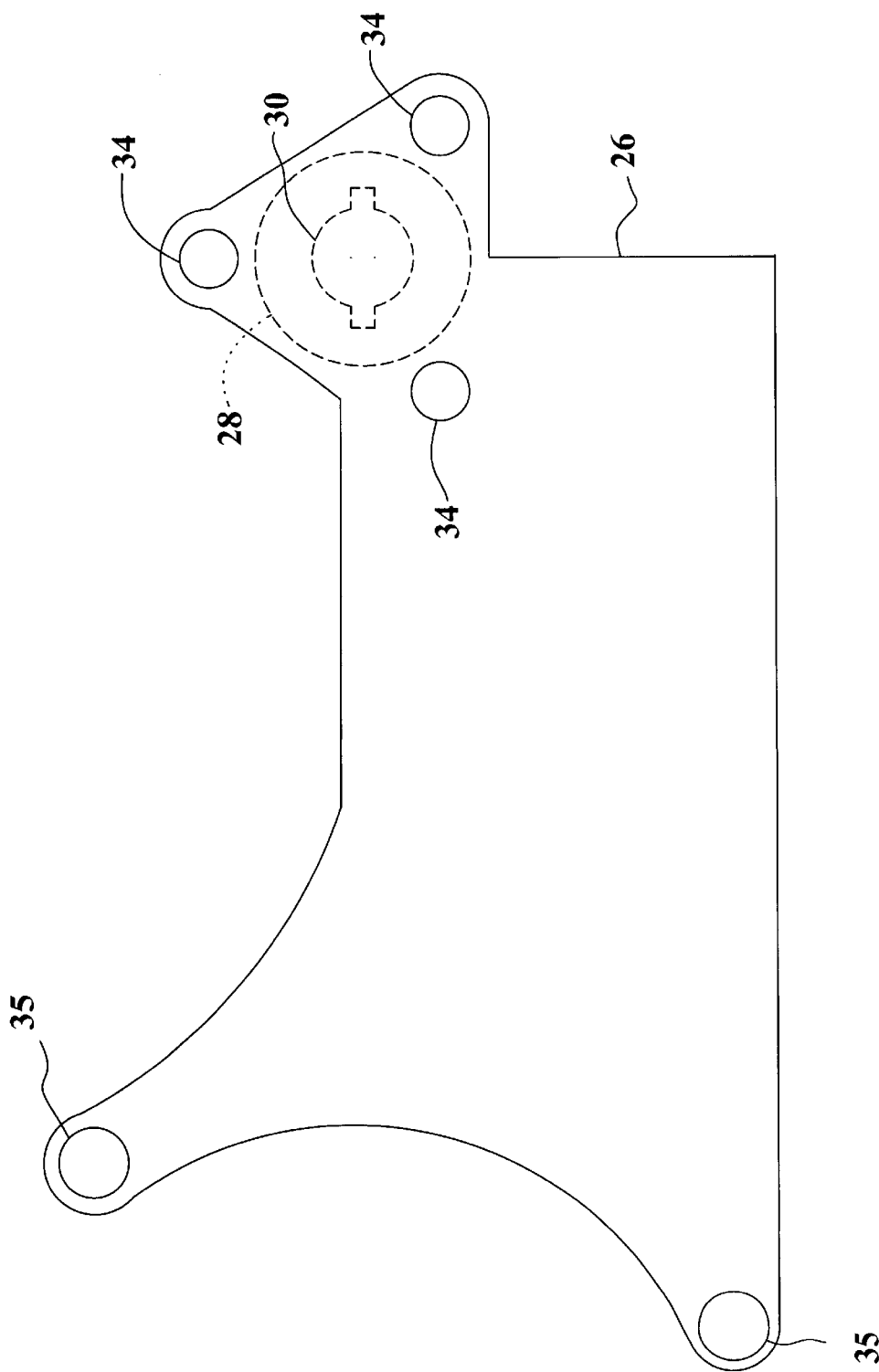
FIG. 3 is a detail view of the locking pin and solenoid bracket shown in FIG. 1.

FIG. 3 is a detail view of the locking pin and solenoid bracket shown in FIG. 1, more clearly showing features identified before, the bolts 34 that secure the solenoid to the bracket 26, and the bolts 35 that secure the brake calipers to the bracket.

Figure 4:
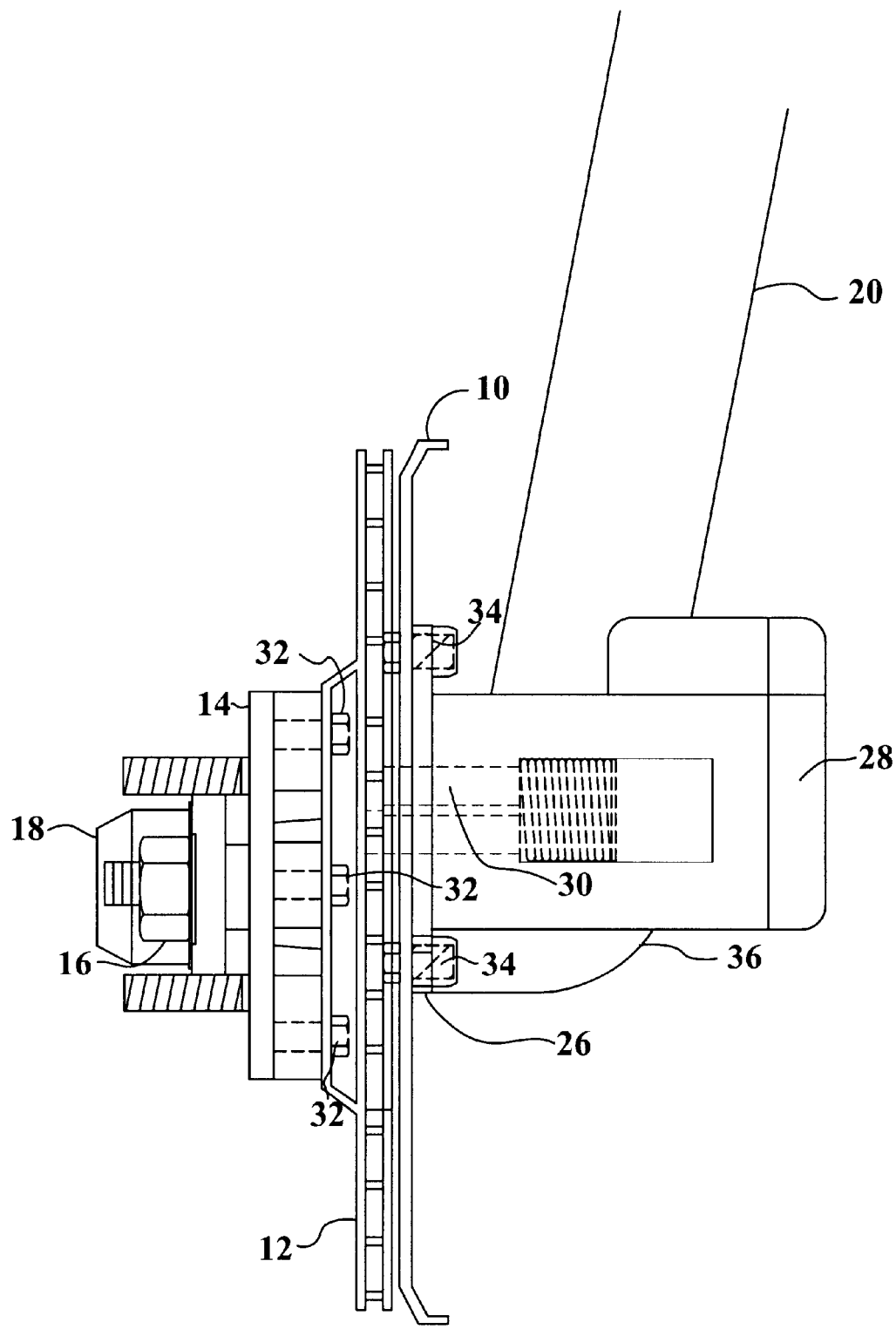
FIG. 4 is a right side elevational view of the motor vehicle wheel hub assembly shown in FIG. 1, with the locking pin in an extended position.

FIG. 4 is a right side elevational view of the motor vehicle wheel hub assembly shown in FIG. 1, with the piston rod 30 in an extended position, passing through openings (which are not shown in the drawings) in the centers of the baffle plate 10 and disk rotor 12 into the inhibitors (which are not visible in FIG. 4) to lock the wheel. The knuckle arm 36 connecting the strut assembly 20 and the hub assembly, which fit through holes in the central metal portion of a tire to fasten the tire to the wheel, are also shown.

Figure 5:
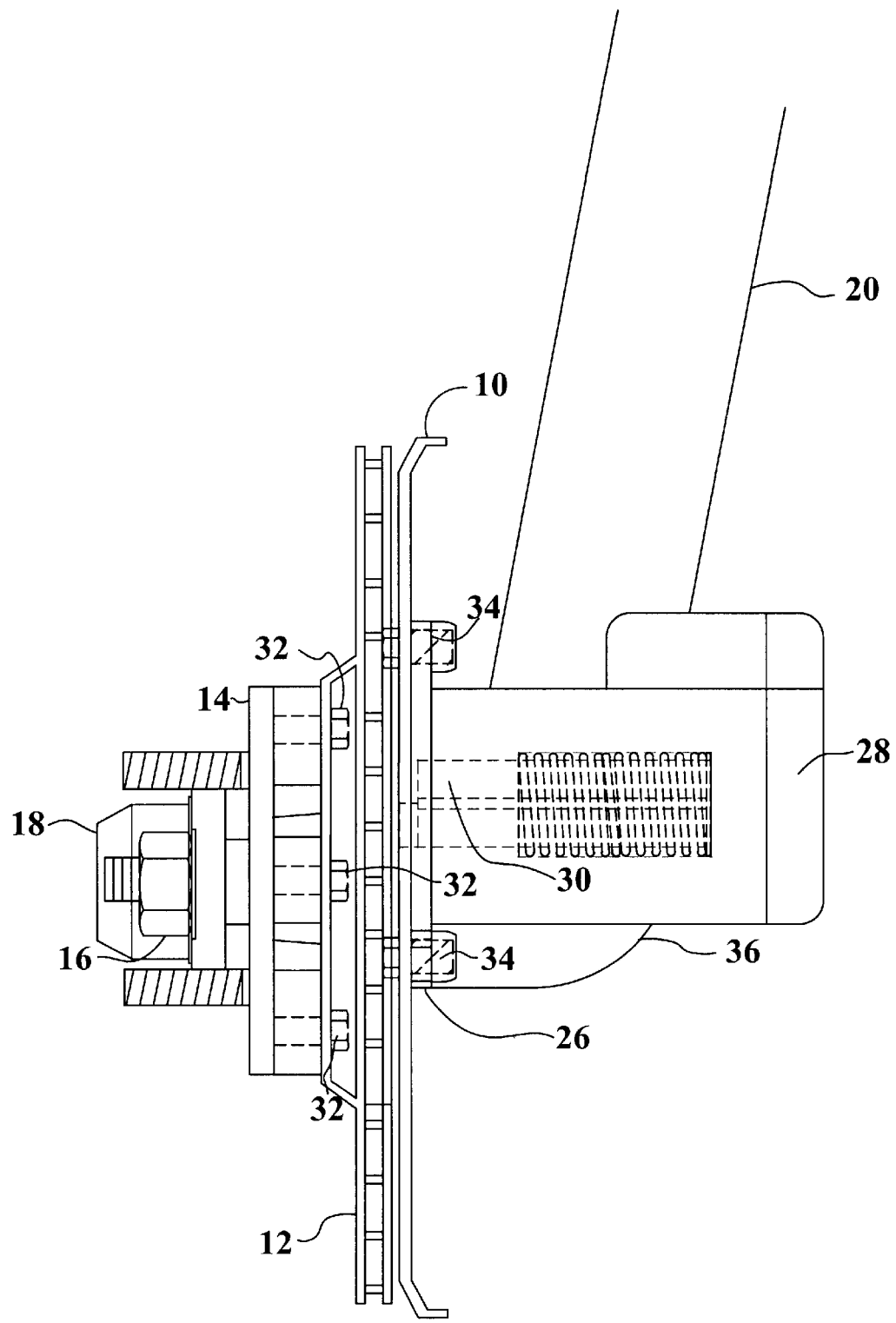
FIG. 5 is a right side elevational view of the motor vehicle wheel hub assembly shown in FIG. 1, with the locking pin in a retracted position.

FIG. 5 is a right side elevational view of the motor vehicle wheel hub assembly shown in FIG. 1, with the piston rod 30 in a retracted position, so that the wheel is unlocked.

Figure 6:
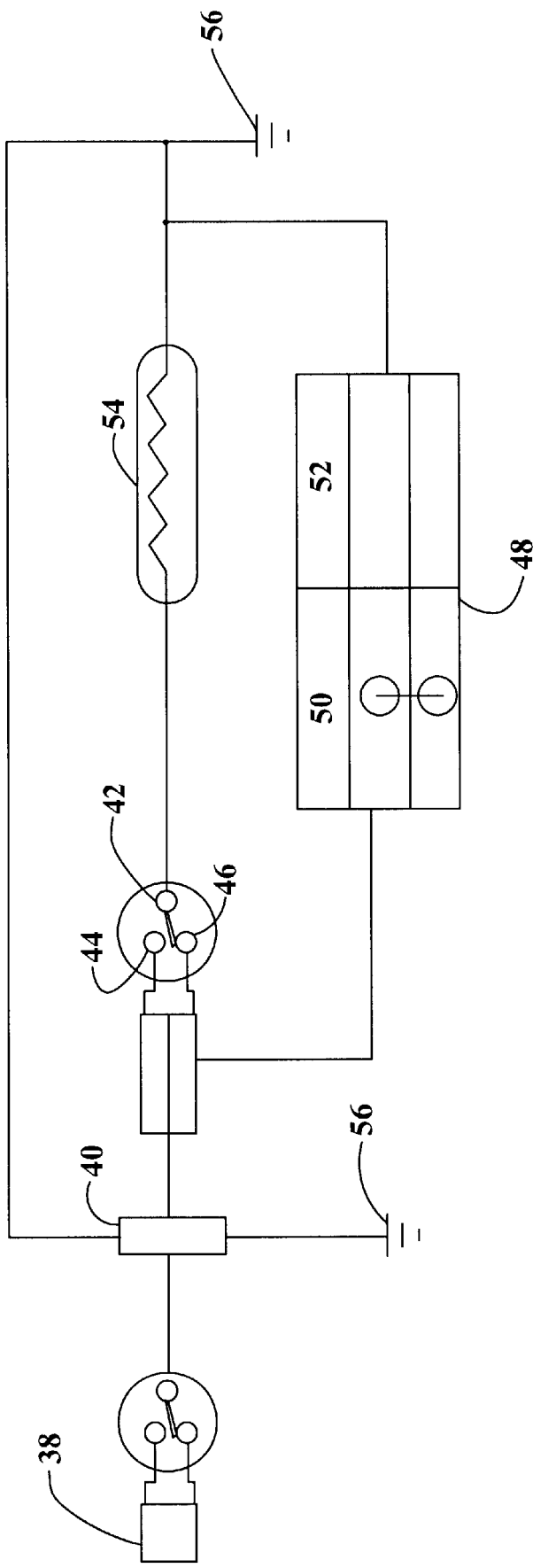
FIG. 6 is a schematic diagrammatic view of the electrical circuits pertaining to the preferred embodiment of the invention.

FIG. 6 is a schematic diagrammatic view of electrical circuits pertaining to the preferred embodiments of the invention, showing the main ignition switch 38, the key pad or code key switch 40, directional switch 42, activator connector 44, deactivator connector 46, a sensor 48 containing a deactivator 50 and an activator 52, a thermal circuit breaker 54, and two grounds 56. When an activation coded key is entered into the ignition (by a keypad or other means), an integrated circuit (not shown) activates a servomotor (not shown) that causes the directional switch to move to contact the activator connector, thus causing electric current to flow through the solenoids described above, thus locking the wheels and brakes. When a deactivation coded key in entered into the ignition (by a keypad or other means), the integrated circuit causes the servomotor to move the directional switch to move to contact the deactivator connector, thus turning off the electric current to the solenoids and releasing the wheels and brakes, and also deactivating the sensor.

Figure 7:
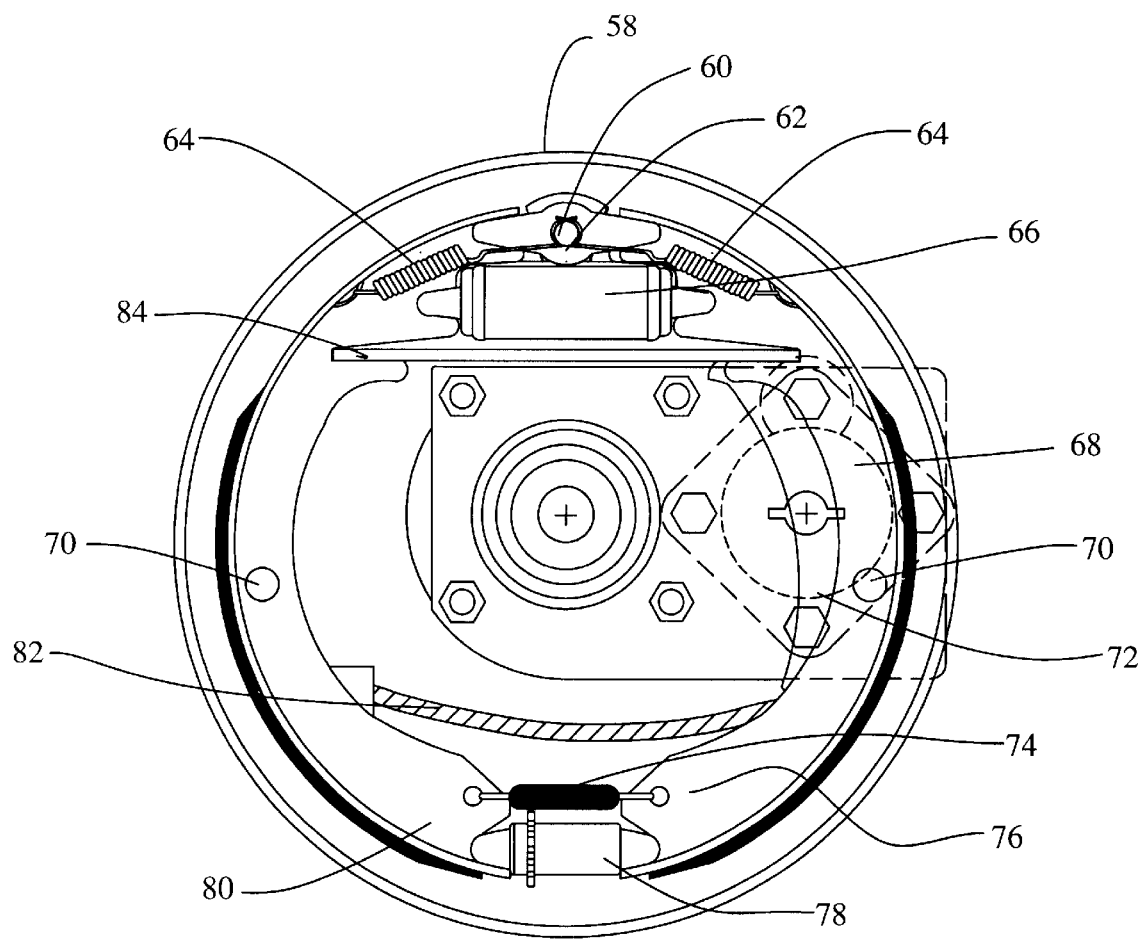
FIG. 7 is a detail view of the hand and foot rear drum brake assembly of the preferred embodiment of the invention.

FIG. 7 is a detail view of the hand and foot rear drum brake assembly of the preferred embodiment of the invention, showing the backing plate 58, the anchor pin and shoe guide 60, anchor plate 62, return spring 64, wheel cylinder 66, anti-theft mounting bracket and retainer plate 68, holes 70, brake lever 72, hold-down spring and cup 74, secondary shoe 76, adjusting screw 78, primary shoe 80, parking brake cable 82, and strut 84. When the user applies the hand or foot brake, the brake cable pulls the primary shoe, the brake lever and secondary shoe outward to make contact with the brake drum. Once these components have fully extended, the anti-theft device is activated, sending the piston rod with the block inhibitor outward, thus blocking the brake lever and preventing the primary and secondary shoe from breaking contact with the brake drum.

Figure 8:
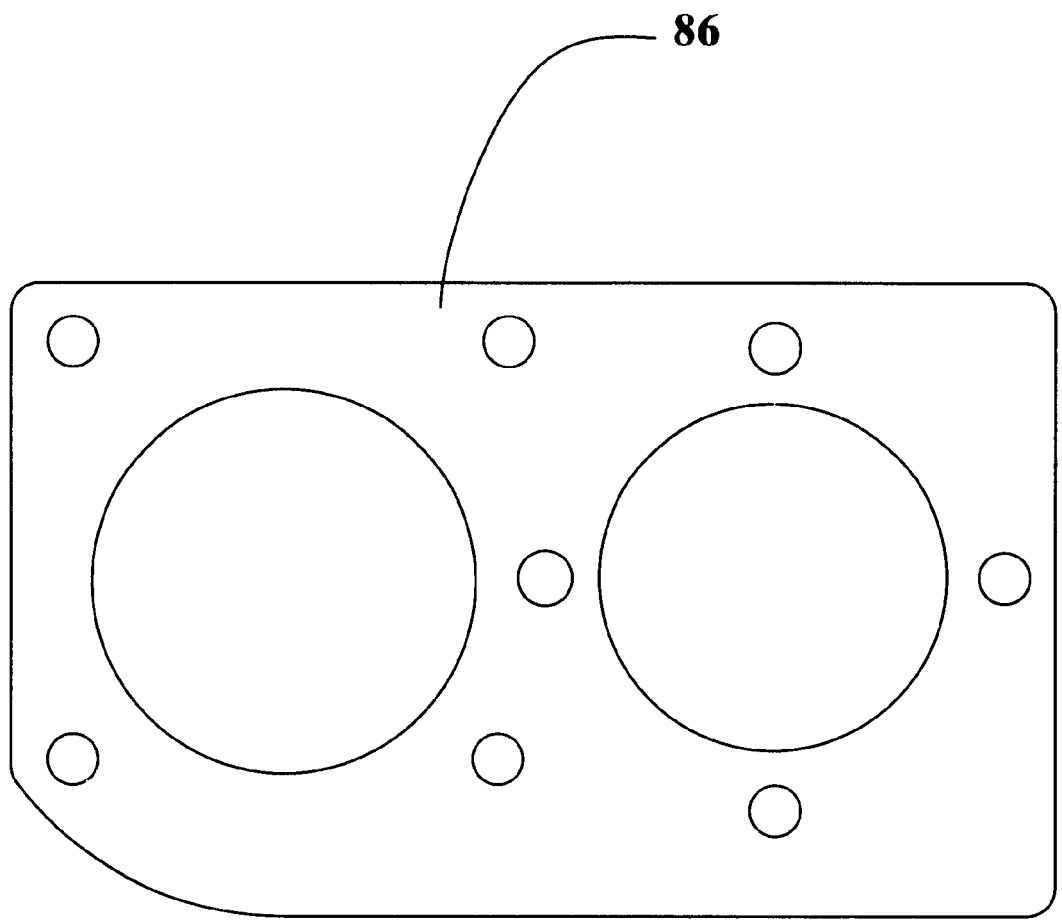
FIG. 8 is a front elevational view of the rear wheels mounting bracket of the preferred embodiment of the invention.

FIG. 8 is a front elevational view of the rear wheels mounting bracket 86, which is bolted to the rear axles assembly. The anti-theft device is bolted to the bracket. It is suitable for all vehicles having disc rotors and drum brakes.

Figure 9:
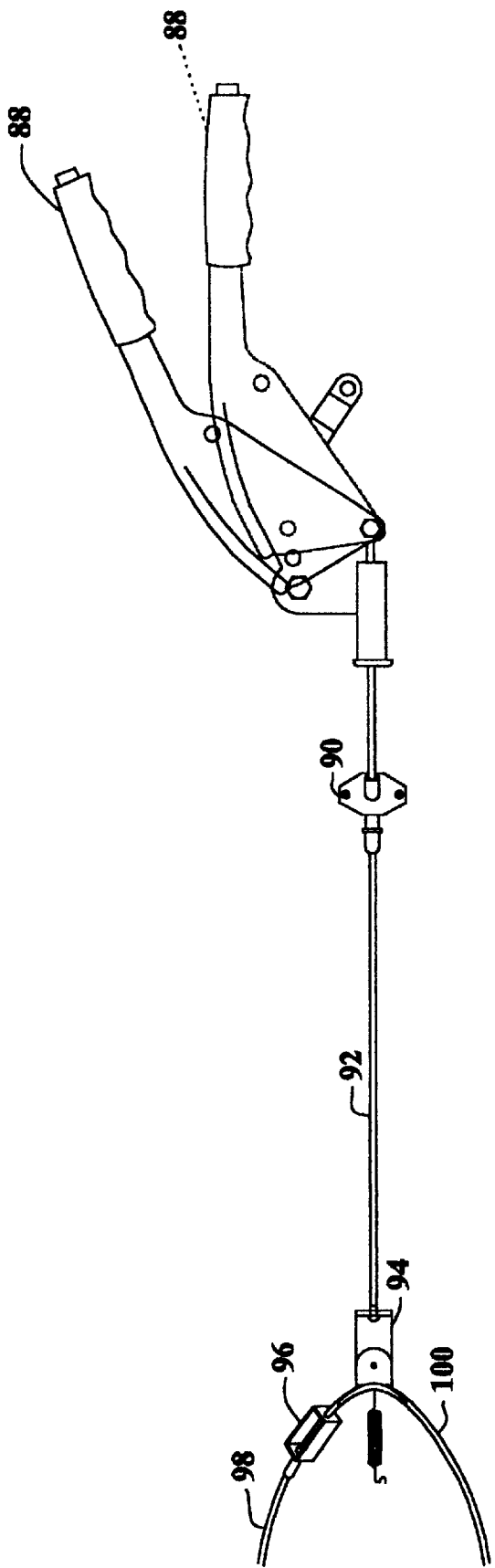
FIG. 9 is a diagrammatic view of the hand parking brake locking feature of the preferred embodiment of the invention.

FIG. 9 is a schematic view of the hand parking brake locking feature of the preferred embodiment of the invention, which is an optional feature that backs up the wheel locking feature shown above, if the parking brake is first engaged. The cable passes into the passenger compartment of the vehicle through retainer 90. The control lever 88 is shown in solid lines in an off position (when the parking brake is released) and in broken lines in an on position (when the parking brake is engaged). On the opposite end of the cable from the control lever is an equalizer 94 connected to an adjustor 96, from which extend the left hand rear cable assembly 98 and the right hand rear cable assembly 100.

Figure 10:
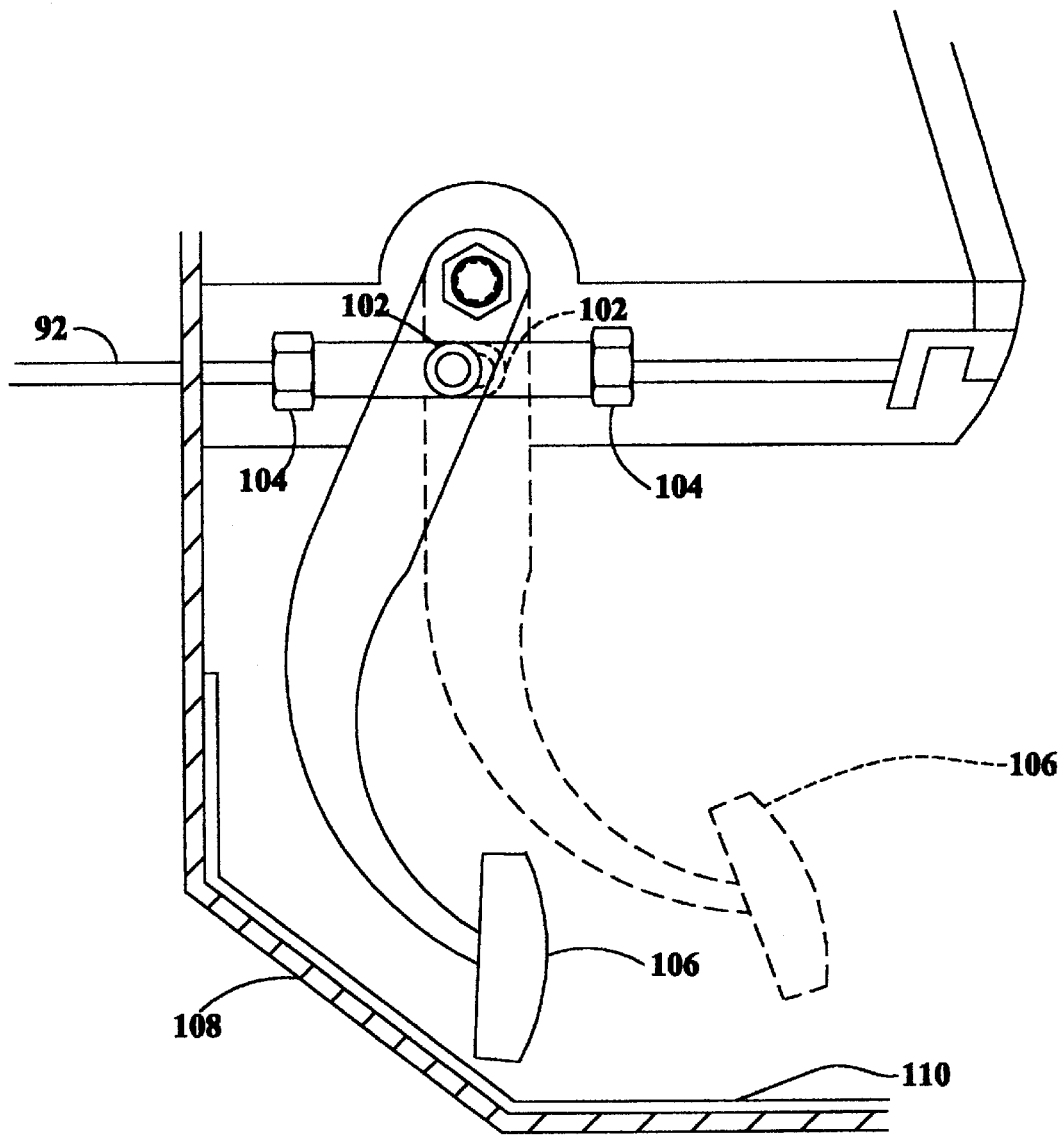
FIG. 10 is a side elevational view of the floor parking brake locking feature of the preferred embodiment of the invention.

FIG. 10 is a floor parking brake locking feature of the preferred embodiment of the invention, which is an alternative optional feature that backs up the wheel locking feature. The brake pedal 106 is shown in a locked position in solid lines, and in an unlocked position in broken lines. Also shown are the cable 92, the input rod 102, the lock nut 104, the floor panel 108, and the melt sheet 110.

Figure 11:
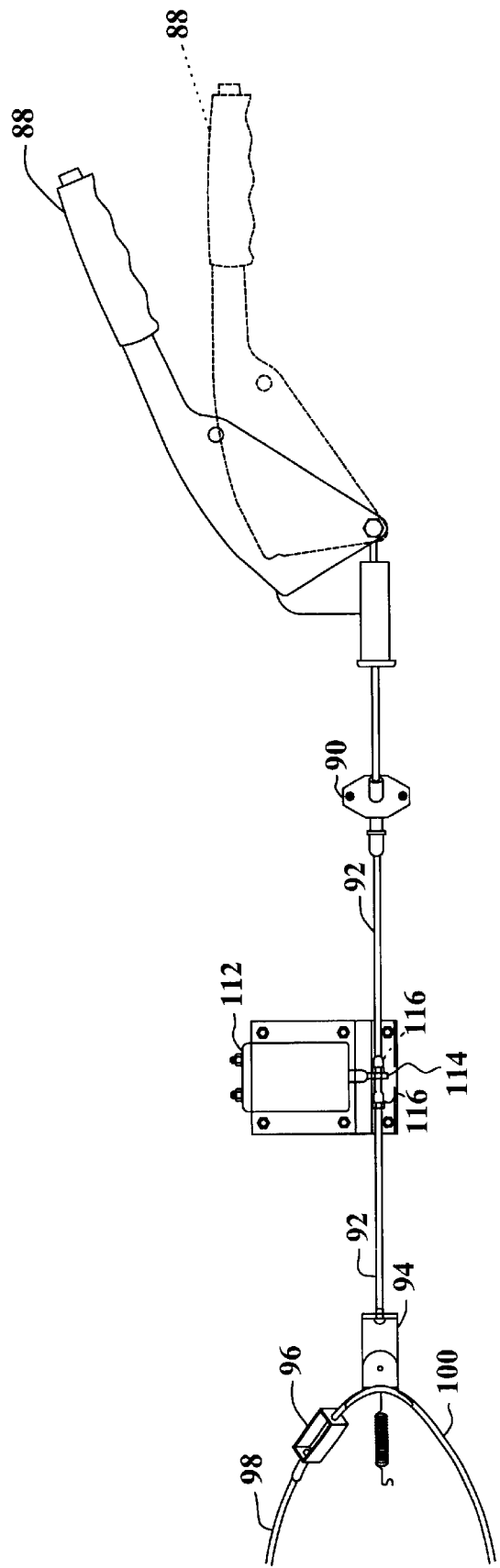
FIG. 11 is a schematic view of the hand parking brake locking feature of the preferred embodiment of the invention, showing an additional solenoid and a clamp to engage a cable inhibitor.

FIG. 11 is a schematic view of the hand parking brake locking feature of the preferred embodiment of the invention, showing an additional solenoid 112 that when energized causes a clamp 114 to move to engage a cable inhibitor 116 to prevent release of the cable 92 and lever 88. When the additional solenoid is de-energized, the clamp moves back to disengage the cable inhibitor, allowing release of the cable and lever. The solenoid may be energized when an activation code is entered, and de-energized when a deactivation code is entered.

It is to be understood that the present invention is not limited to the sole embodiment described above, but encompasses any and all embodiments within the scope of the following claims.

I claim:

1. An anti-theft system for motor vehicles, comprising:
   at least one inhibitor in a disc rotor of at least one wheel of a motor vehicle;
   at least one locking member that can be inserted into at least one inhibitor to prevent at least one wheel from turning; and
   at least one solenoid that, when energized, causes at least one locking member to be inserted into at least one inhibitor, and when de-energized, causes at least one locking member to be withdrawn from at least one inhibitor;
   wherein at least one of the inhibitors in at least one of the disc rotors is an arcuate recess;
   there are a plurality of the inhibitors in at least one of the disc rotors, and the inhibitors are an equal distance from the center of the wheel;
   the inhibitors in at least one of the disc rotors are arranged in a circular pattern around a center of the wheel;
   the inhibitors in at least one of the disc rotors are separated by obstructions;
   there are four obstructions arranged at right angles;
   at least one solenoid is energized when an activation code is entered;
   at least one solenoid is de-energized when a deactivation code is entered;

the activation code and the deactivation code are entered using a keypad;

at least one locking member is cylindrical;

means are included for locking at least one brake of the vehicle when the activation code is entered;

means are included for releasing at least one brake when the deactivation code is entered;

at least one brake is locked by preventing release of a cable attached to a lever controlling the brake;

when the activation code is entered, an additional solenoid is energized that causes a clamp to engage a cable inhibitor that prevents release of the cable and the lever; and when the deactivation code is entered, the additional solenoid is de-energized, causing the clamp to disengage the cable inhibitor, and allowing release of the cable and the lever.

2. The anti-theft system for motor vehicles according to claim 1, wherein the motor vehicle is an automobile.

3. A method of preventing theft of a motor vehicle, comprising the steps of:

entering an activation coded key in an ignition;

energizing at least one solenoid;

movement of a locking member by the solenoid;

engagement of the locking member with an inhibitor in a disc rotor of a wheel of a motor vehicle;

engaging a brake by movement of a cable controlled by a lever;

energizing an additional solenoid;

movement of a clamp by the additional solenoid; and engagement of an inhibitor on the cable by the clamp to prevent movement of the cable and release of the brake.

4. A method of preventing theft of a motor vehicle according to claim 3, wherein the vehicle is an automobile.

* * * * *